US010824722B1

(12) United States Patent
Tevet et al.

(10) Patent No.: US 10,824,722 B1
(45) Date of Patent: Nov. 3, 2020

(54) METHODS AND SYSTEMS FOR GENETIC MALWARE ANALYSIS AND CLASSIFICATION USING CODE REUSE PATTERNS

(71) Applicant: Intezer Labs, Ltd., Tel Aviv Jaffa (IL)

(72) Inventors: Itai Tevet, New York, NY (US); Roy Halevi, Tel Aviv-Jaffa (IL); Ari Eitan, Tel Aviv-Jaffa (IL)

(73) Assignee: Intezer Labs, Ltd., Tel Aviv Jaffa (IL)

( * ) Notice: Subject to any disclaimer, the term of this patent is extended or adjusted under 35 U.S.C. 154(b) by 0 days.

(21) Appl. No.: 16/592,791

(22) Filed: Oct. 4, 2019

(51) Int. Cl.
*G06F 21/56* (2013.01)
*G06F 9/30* (2018.01)

(52) U.S. Cl.
CPC .......... *G06F 21/563* (2013.01); *G06F 9/3001* (2013.01); *G06F 9/30032* (2013.01); *G06F 9/30076* (2013.01); *G06F 21/56* (2013.01); *G06F 21/565* (2013.01); *G06F 2221/033* (2013.01)

(58) Field of Classification Search
CPC .............................. G06F 21/56–564
See application file for complete search history.

(56) References Cited

U.S. PATENT DOCUMENTS

2007/0240217 A1* 10/2007 Tuvell ................... G06F 21/565
726/24
2009/0313700 A1* 12/2009 Horne .................... G06F 21/564
726/24
2014/0068768 A1* 3/2014 Lospinuso ............ G06F 21/561
726/23
2015/0186649 A1* 7/2015 Humble ................ G06F 21/564
726/23
2017/0344352 A1* 11/2017 Peterson ................. G06F 8/427

OTHER PUBLICATIONS

Rad, B. B. and Masrom, M.; "Metamorphic Virus Variants Classfication Using Opcode Frequency Histogram", Jul. 23-25, 2010, Proceedings of the 14th WSEAS International Conference on Computers, pp. 147-155 (Year: 2010).*
Vinod P, V. Laxmi, and M.S. Gaur; "Survey on Malware Detection Methods", Mar. 17-19, 2009, 3rd Hackers'Workshop on Computer and Internet Security, pp. 74-49 (Year: 2009).*

* cited by examiner

*Primary Examiner* — Daniel B Potratz
(74) *Attorney, Agent, or Firm* — Reuven K. Mouallem; FlashPoint IP Ltd.

(57) ABSTRACT

The present invention discloses methods and systems for genetic malware analysis and classification using code reuse patterns. Methods include the steps of: upon receiving a target binary file, disassembling the target binary file into assembly code; extracting individually-identifiable code fragments from the assembly code; normalizing the individually-identifiable code fragments into target genes; and collating the target genes into a code genome database. Alternatively, the step of normalizing includes upon detecting a MOV instruction, corresponding to a command to move values to a register before performing a CALL instruction, normalizing the MOV instruction to a PUSH instruction in the target genes. Alternatively, the step of normalizing includes upon detecting a SUB instruction, corresponding to a command for a subtraction operation to be performed, normalizing the SUB instruction to an ADD instruction, corresponding to a command for an addition operation to be performed, in the target genes.

28 Claims, 2 Drawing Sheets

Exemplary Embodiment

METHODS AND SYSTEMS FOR GENETIC MALWARE ANALYSIS AND CLASSIFICATION USING CODE REUSE PATTERNS

FIELD AND BACKGROUND OF THE INVENTION

The present invention relates to methods and systems for genetic malware analysis and classification using code reuse patterns.

Despite the rapid pace of technology in general, few industries today are as dynamic as that of cyber security. Attackers' techniques are constantly evolving, and along with them, the potential threat.

For security teams, the challenge remains not to keep up, but rather, to outpace them. It is a persistent struggle: a never-ending, record-setting marathon at a constant sprint. Even as security professionals rest, attackers are hard at work. The tools and approaches used must also adapt in order to stay a step ahead in defending their organizations. Malware classification, which encompasses both the identification and attribution of code, has the power to unlock many clues that aid security teams in achieving this.

Such clues provide a greater understanding of potential adversaries. Going beyond whether code is trustworthy or malicious offers a multifaceted view into attackers' mindsets and ultimately, their goals.

Yet many security teams stop their line of inquiry once they reach a conclusion about a given file. If the code is trustworthy, no action is required. If the code is malicious, it needs to be mitigated and eradicated as quickly as possible, with recovery of important files occurring in tandem.

Terminating a process and deleting a file offers zero guarantees and solves no problems in the long term, unfortunately. Today, it's critical (and until now, quite complicated) to both analyze threats as well as fully understand them after the initial breach in an automated way. This is the one way that attackers can be remotely 'interrogated,' enabling security teams to uncover the reasons behind their actions simply rather than remediating and remaining oblivious.

Standard solutions such as signature based (AV) and behavioral analysis tools (sandboxes, EDR) can be circumvented by threat actors reusing code and assets. Whether legitimate or malicious, nearly every software is composed of previously written code; the key to deeply understanding its nature and origins lies in discovering code that has appeared in previously known software. Reports on malware statistics indicate that there are around 350,000 new samples every day. Attackers reuse their code, composing it differently to create new samples with different hashes. The high number of new files has made it difficult to keep up with the pace.

It would be desirable to have methods and systems for genetic malware analysis and classification using code reuse patterns. Such methods and systems would, inter alia, overcome the various limitations mentioned above.

SUMMARY

It is the purpose of the present invention to provide methods and systems for genetic malware analysis and classification using code reuse patterns.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

Embodiments of the present invention utilize genetic malware analysis which is based on the evolutionary principle that all software, whether legitimate or malicious, is comprised of previously written code. Malware authors leverage code reuse when employing new campaigns. For defenders, this provides critical information for detection, classification, level of sophistication and threat actor capabilities.

Embodiments of the present invention exploit such aspects by generating a complete mapping of a suspicious file including information about which pieces of code have been seen only in a specific malware family, only in trusted software, or in both malicious and trusted software. In addition, metadata such as who is the vendor who wrote the code, and which versions does the code appear in provide useful information and context regarding the granular assembly-code pieces.

Moreover, knowing that a piece of code hasn't been seen before, can also indicate the following. If a suspicious file includes a lot of unique code, it might be a sign of a new malware variant, and that might be used as a strong indicator for detecting sophisticated threats. In such cases, the organization's SOC (Security Operation Center) or IR (Incident Response) team knows to place their focus and resources on these pieces of code, in order to determine their meaning.

Embodiments of the present invention enable security teams to reduce the number of files that need to be manually analyzed, enabling them to focus on the harmful, malicious files, prioritizing actual threats over false positives. Moreover, the ability to index specific malware targeting the organization into the genome database, means security professionals can not only ensure immunity for a single incident, but immune the organization against an adversary entirely. In addition, tracking code reuse in malware, forces the attacker to rewrite their tools and assets, making it much harder to conduct cyber-attacks.

Embodiments of the present invention enable trusted code to be indexed as well. For example, if proprietary software has code that was never seen before in the genome database, the code can be indexed as trusted. Such code would be visible only to the software's owner.

Implementations of the present invention dissect any given executable file (e.g., from disk or memory) into tiny pieces of binary code, referred to as genes, and compare the file's genes to a code genome database containing billions of genes from trusted and malicious software.

Therefore, according to the present invention, there is provided for the first time a method for genetic malware analysis and classification using code reuse patterns, the method including the steps of: (a) upon receiving a target binary file, disassembling the target binary file into assembly code; (b) extracting individually-identifiable code fragments from the assembly code; (c) normalizing the individually-identifiable code fragments into target genes; and (d) collating the target genes into a code genome database.

Alternatively, the step of normalizing includes upon detecting a NOP instruction, corresponding to a command for no operation to be performed, removing the NOP instruction from the target genes.

Alternatively, the step of normalizing includes upon detecting a MOV instruction, corresponding to a command to move values to a register before performing a CALL instruction, normalizing the MOV instruction to a PUSH instruction in the target genes.

Most alternatively, the MOV instruction is normalized to the PUSH regardless of whether the MOV instruction and the CALL instruction are consecutive instructions.

Alternatively, the step of normalizing includes upon detecting a SUB instruction, corresponding to a command for a subtraction operation to be performed, normalizing the SUB instruction to an ADD instruction, corresponding to a command for an addition operation to be performed, in the target genes.

Alternatively, the method further includes the steps of: (e) identifying the target genes in the code genome database; (f) detecting all files and/or code families in the code genome database containing the target genes from the target binary file; and (g) determining an accurate designation of the target binary file based on the target genes.

Most alternatively, the step of determining includes determining the target binary file is malicious based on shared genes in the target genes and the code genome database only found in malicious files.

Most alternatively, the step of determining includes determining the target binary file is benign based on shared genes in the target genes and the code genome database only found in trusted files.

Most alternatively, the step of determining includes determining the target binary file is associated with at least one malware file family based on families of files that the target binary file shares shared genes with.

According to the present invention, there is provided for the first time a system for genetic malware analysis and classification using code reuse patterns, the system including: (a) a CPU for performing computational operations; (b) a memory module for storing data; and (c) a disassembly module configured for, upon receiving a target binary file, disassembling the target binary file into assembly code; (d) an extracting module configured for extracting individually-identifiable code fragments from the assembly code; (e) a normalizing module configured for normalizing the individually-identifiable code fragments into no target genes; and (f) a collating module configured for collating the target genes into a code genome database.

Alternatively, the normalizing includes upon detecting a NOP instruction, corresponding to a command for no operation to be performed, removing the NOP instruction from the target genes.

Alternatively, the normalizing includes upon detecting a MOV instruction, corresponding to a command to move values to a register before performing a CALL instruction, normalizing the MOV instruction to a PUSH instruction in the target genes.

Most alternatively, the MOV instruction is normalized to the PUSH regardless of whether the MOV instruction and the CALL instruction are consecutive instructions.

Alternatively, the normalizing includes upon detecting a SUB instruction, corresponding to a command for a subtraction operation to be performed, normalizing the SUB instruction to an ADD instruction, corresponding to a command for an addition operation to be performed, in the target genes.

Alternatively, the system further includes: (g) an identifying module configured for identifying the target genes in the code genome database; (h) a detecting module configured for detecting all files and/or code families in the code genome database containing the target genes from the target binary file; and (i) a determining module configured for determining an accurate designation of the target binary file based on the target genes.

Most alternatively, the determining includes determining the target binary file is malicious based on shared genes in the target genes and the code genome database only found in malicious files.

Most alternatively, the determining includes determining the target binary file is benign based on shared genes in the target genes and the code genome database only found in trusted files.

Most alternatively, the determining includes determining the target binary file is associated with at least one malware file family based on families of files that the target binary file shares shared genes with.

According to the present invention, there is provided for the first time a non-transitory computer-readable storage medium, having computer-readable code embodied on the non-transitory computer-readable storage medium, for genetic malware analysis and classification using code reuse patterns, the computer-readable code including: (a) program code for, upon receiving a target binary file, disassembling the target binary file into assembly code; (b) program code for extracting individually-identifiable code fragments from the assembly code; (c) program code for normalizing the individually-identifiable code fragments into target genes; and (d) program code for collating the target genes into a code genome database.

20. The non-transitory computer-readable storage medium of claim 19, wherein normalizing includes upon detecting a NOP instruction, corresponding to a command for no operation to be performed, removing the NOP instruction from the target genes.

Alternatively, the normalizing includes upon detecting a MOV instruction, corresponding to a command to move values to a register before performing a CALL instruction, normalizing the MOV instruction to a PUSH instruction in the target genes.

Most alternatively, the MOV instruction is normalized to the PUSH regardless of whether the MOV instruction and the CALL instruction are consecutive instructions.

Alternatively, the normalizing includes upon detecting a SUB instruction, corresponding to a command for a subtraction operation to be performed, normalizing the SUB instruction to an ADD instruction, corresponding to a command for an addition operation to be performed, in the target genes.

Alternatively, the computer-readable code further includes: (e) program code for identifying the target genes in the code genome database; (f) program code for detecting all files and/or code families in the code genome database containing the target genes from the target binary file; and (g) program code for determining an accurate designation of the target binary file based on the target genes.

Most alternatively, the determining includes determining the target binary file is malicious based on shared genes in the target genes and the code genome database only found in malicious files.

Most alternatively, the determining includes determining the target binary file is benign based on shared genes in the target genes and the code genome database only found in trusted files.

Most alternatively, the determining includes determining the target binary file is associated with at least one malware file family based on families of files that the target binary file shares shared genes with.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE ILLUSTRATIVE EMBODIMENTS

The present invention relates to methods and systems for genetic malware analysis and classification using code reuse patterns. The principles and operation for providing such methods and systems, according to the present invention, may be better understood with reference to the accompanying description and the drawings.

Figure 1B:
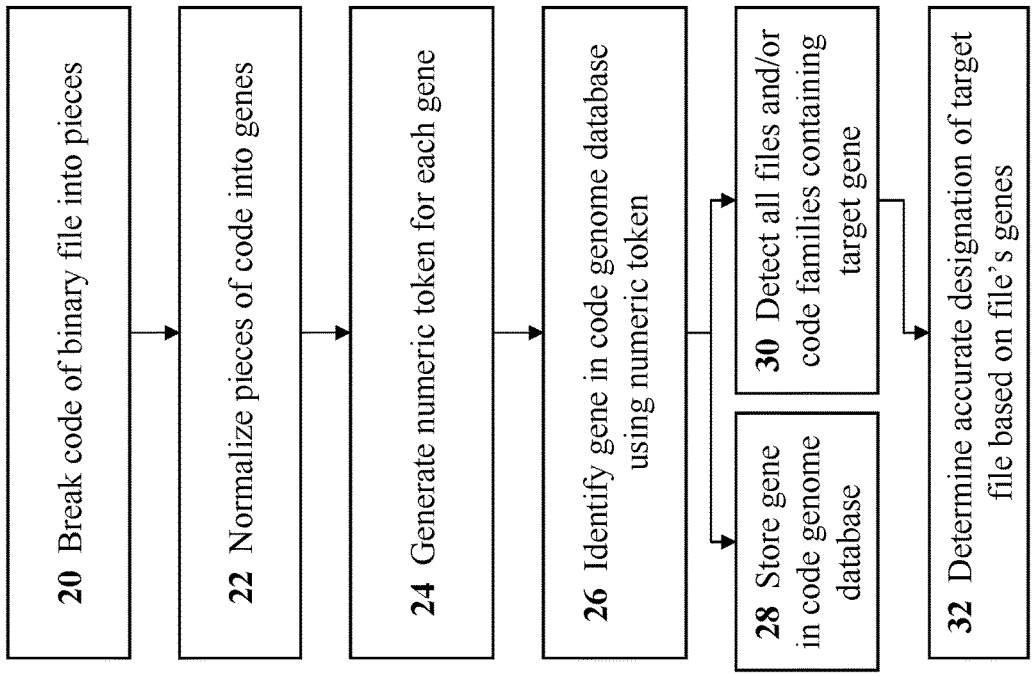
FIG. 1B is a simplified flowchart of the major process steps for genetic malware analysis and classification, according to embodiments of the present invention.
Figure 1A:
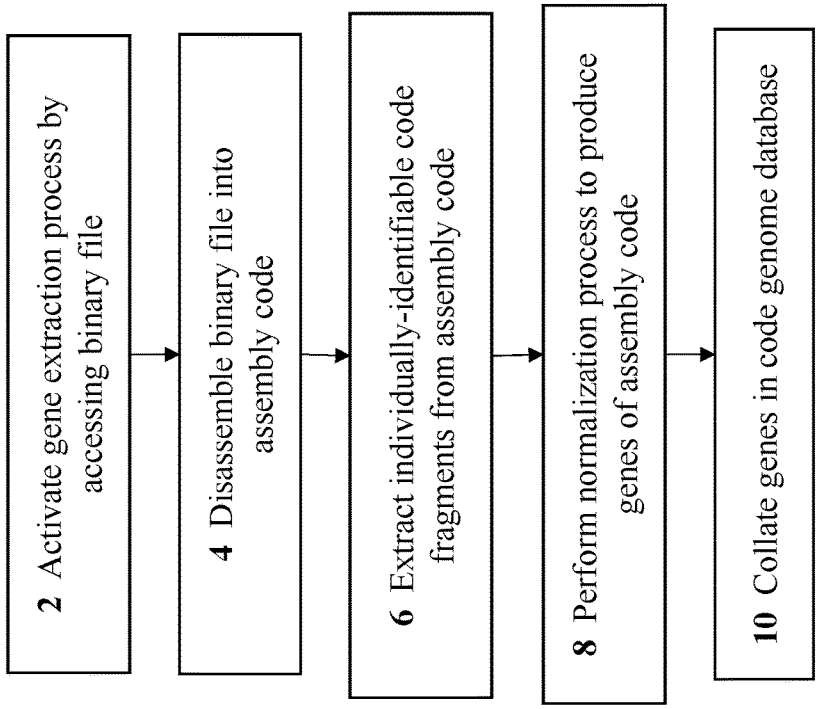
FIG. 1A is a simplified flowchart of the major process steps for the gene extraction process, according to embodiments of the present invention.

Referring to the drawings, FIG. 1A is a simplified flowchart of the major process steps for the gene extraction process, according to embodiments of the present invention. The process starts with activation of the gene extraction process upon accessing a target binary file (Step 2). The binary file is then disassembled into assembly code (Step 4). Individually identified code fragments are extracted from the assembly code (Step 6). A normalization process is then performed to produce the genes of assembly code (Step 8). The genes are finally collated in a code genome database (Step 10).

The normalization process is based on rules that can support multiple architectures and instruction sets (e.g., x86, x64, ARM, and ARM64) under different operating systems (Windows, Linux, and Android), and even can be effective for non-native, intermediate languages (e.g., .NET, Java, Python, and Visual Basic). Multiple code instructions can be normalized into a single instruction. Different rules are employed depending on the platform of the target file (i.e., different rules employed for x86, x64, .NET, and Java).

Some exemplary normalization rules include the following. The code of the target file may typically include an instruction for no operation to be performed (referred to as a NOP instruction). When a NOP instruction is detected, the system removes the instruction from the normalized code. The code of the target file may typically include a MOV instruction to move values to a register before calling a function. When such a MOV instruction is detected, the system normalizes the instruction to a PUSH instruction in the normalized code.

There are many ways for how subroutines receive parameters from their caller, and how they return a result, or call a function (referred to as a "calling convention"). A CALL instruction will jump to the function code and execute it. Such considerations depend on the compilation flags during the process. In order to be flexible, the system detects the genes as identical, even though the assembly is different. In one configuration, in order to send values to a function, the stack is utilized with a PUSH command. In another configuration, a MOV command moves values to registers before calling a function. The system normalizes such MOV commands to PUSH commands.

The system also supports situations in which the MOV and CALL commands are not consecutive instructions with additional instructions interspersed between them. In such a case, the MOV command will be normalized to a PUSH command even though the CALL command doesn't immediately follow the MOV command.

As another exemplary normalization rule, for some architectures, a SUB instruction (i.e., a subtraction command) is normalized to an ADD instruction (i.e., an addition command). The underlying concept/operation for both commands is the same. In some instances, code reuse is "masked" by such trivial substitutions (i.e., replacing an ADD with a SUB). By applying such a normalization, a broader set of code genes can be categorized and analyzed.

The motivation for such normalization is the fact that the same source code can produce different assembly code. Without such normalization rules, similar code fragments which might go undetected because they are not an exact match in a one-to-one code comparison. Such an approach needs to balance being flexible in the rules and finding accurate matches (e.g., non-identical assembly code produced from the same source code) in the code genome database, while not making the rules too generic (e.g., matches between two assembly code fragments which are not related to a shared origin source code).

FIG. 1B is a simplified flowchart of the major process steps for genetic malware analysis and classification, according to embodiments of the present invention. The process starts when the code of the target binary file is broken into pieces (Step 20), which are then normalized into genes (Step 22). A numeric token is generated for each gene (Step 24). The numeric token is used to identify the gene in the code genome database (Step 26). The gene can then be stored in the code genome database (Step 28), or used to detect all files and/or code families containing the target gene (Step 30). Finally, following Step 30 and/or iterations of the process thereof, the system can determine the accurate designation (e.g., malicious, trusted, or library) of the target file being analyzed based on the total classification of the file's genes (Step 32).

Figures 2A, 2B:
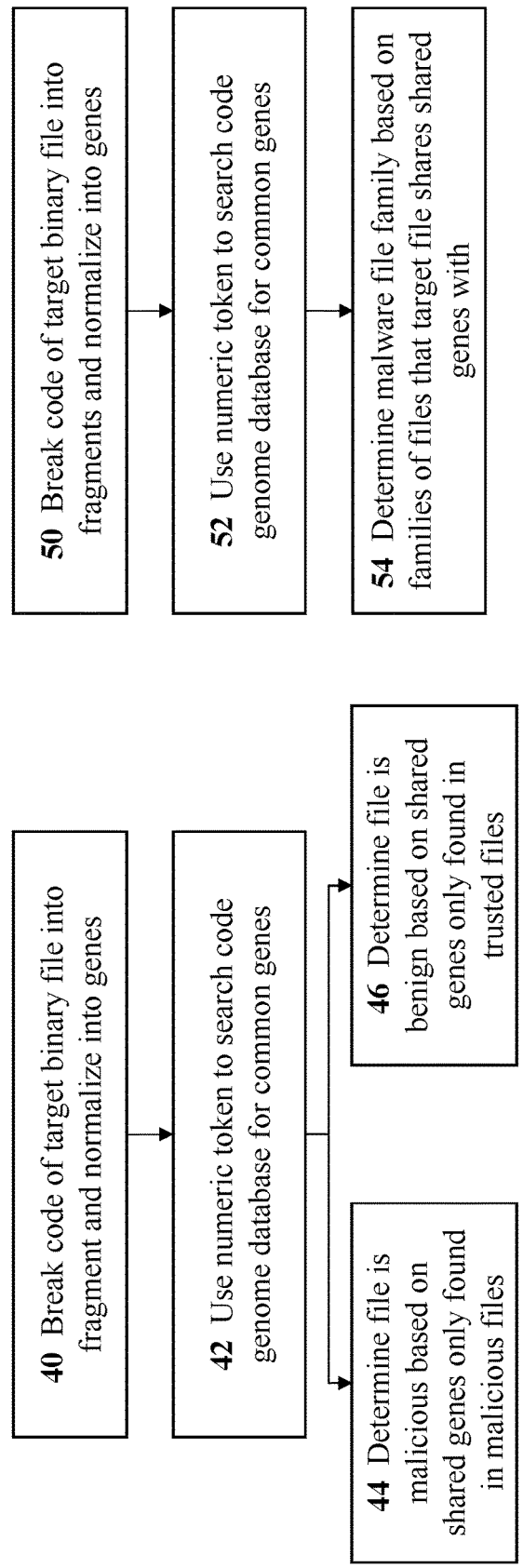
FIG. 2A is a simplified flowchart of the major process steps for determining whether a target file is benign or malicious based on code reuse, according to embodiments of the present invention.
FIG. 2B is a simplified flowchart of the major process steps for classifying a target file to a malware family based on code reuse, according to embodiments of the present invention.

FIG. 2A is a simplified flowchart of the major process steps for determining whether a target file is benign or malicious based on code reuse, according to embodiments of the present invention. The process starts with breaking the code of a target binary file into fragments, and normalizing the fragments into genes (Step 40). The numeric tokens are then used to search the code genome database for shared genes (Step 42). The target file is determined to be malicious if it contains shared genes that are only found in malicious files (Step 44). The target file is determined to be benign if it contains shared genes that are only found in trusted files (Step 46).

FIG. 2B is a simplified flowchart of the major process steps for classifying a target file to a malware family based on code reuse, according to embodiments of the present invention. The process similarly starts with breaking the code of a target binary file into fragments, and normalizing the fragments into genes (Step 50). The numeric tokens are then used to search the code genome database for shared genes (Step 52). The malware file family (or families) to which the target file belongs to is determined based on the families of files that the target file shares shared genes with (Step 54).

While the present invention has been described with respect to a limited number of embodiments, it will be appreciated that many variations, modifications, and other applications of the present invention may be made.

What is claimed is:

1. A method for genetic malware analysis and classification using code reuse patterns, the method comprising the steps of:
   (a) upon receiving a target binary file, disassembling said target binary file into assembly code;
   (b) extracting individually-identifiable code fragments from said assembly code;
   (c) normalizing said individually-identifiable code fragments into target genes, wherein said step of normalizing:
      (i) groups certain instructions in a given said individually-identifiable code fragment that produce identical instruction outputs either individually or in conjunction with at least one other instruction in said given individually-identifiable code fragment; and
      (ii) groups certain said individually-identifiable code fragments into a unique target gene, of said target genes, that forms at most exclusively only one function code for performing a command instruction;
   (d) collating said target genes into a code genome database; and
   (e) detecting all files and/or code families in said code genome database containing said target genes from said target binary file, wherein said step of detecting includes prioritizing that false-positive matches between said files and/or said code families of said target binary file and said target genes are not detected, wherein said false-positive matches are exemplified as genericized matches among said target genes which are not related to a shared origin source code.

2. The method of claim 1, wherein said step of normalizing includes upon detecting a NOP instruction, corresponding to a command for no operation to be performed, removing said NOP instruction from said target genes.

3. The method of claim 1, wherein said step of normalizing includes upon detecting a MOV instruction in a specific said individually-identifiable code fragment, corresponding to a command to move values to a register, and wherein said MOV instruction is listed in said specific individually-identifiable code fragment before a CALL instruction, normalizing said MOV instruction to a PUSH instruction in said target genes.

4. The method of claim 3, wherein said MOV instruction is normalized to said PUSH regardless of whether said MOV instruction and said CALL instruction are consecutive instructions.

5. The method of claim 1, wherein said step of normalizing includes upon detecting a SUB instruction, corresponding to a command for a subtraction operation to be performed, normalizing said SUB instruction to an ADD instruction, corresponding to a command for an addition operation to be performed, in said target genes.

6. The method of claim 1, the method further comprising the step of:
   (f) determining an accurate designation of said target binary file based on said target genes.

7. The method of claim 6, wherein said step of determining includes determining said target binary file is malicious based on shared genes in said target genes and said code genome database only found in malicious files.

8. The method of claim 6, wherein said step of determining includes determining said target binary file is benign based on shared genes in said target genes and said code genome database only found in trusted files.

9. The method of claim 6, wherein said step of determining includes determining said target binary file is associated with at least one malware file family based on families of files that said target binary file shares shared genes with.

10. The method of claim 1, wherein said step of normalizing includes normalizing multiple code instructions into a single code instruction.

11. A system for genetic malware analysis and classification using code reuse patterns, the system comprising:
    (a) a CPU for performing computational operations;
    (b) a memory for storing data and having computer-readable code embodied therein, wherein said computer-readable code includes:
       (i) program code for, upon receiving a target binary file, disassembling said target binary file into assembly code;
       (ii) program code for extracting individually-identifiable code fragments from said assembly code;
       (iii) program code for normalizing said individually-identifiable code fragments into target genes, wherein said normalizing:
          (A) groups certain instructions in a given said individually-identifiable code fragment that produce identical instruction outputs either individually or in conjunction with at least one other instruction in said given individually-identifiable code fragment; and
          (B) groups certain said individually-identifiable code fragments into a unique target gene, of said target genes, that forms at most exclusively only one function code for performing a command instruction;
       (iv) program code for collating said target genes into a code genome database; and
       (v) program code for detecting all files and/or code families in said code genome database containing said target genes from said target binary file, wherein said detecting includes prioritizing that false-positive matches between said files and/or said code families of said target binary file and said target genes are not detected, wherein said false-positive matches are exemplified as genericized matches among said target genes which are not related to a shared origin source code.

12. The system of claim 11, wherein said normalizing includes upon detecting a NOP instruction, corresponding to a command for no operation to be performed, removing said NOP instruction from said target genes.

13. The system of claim 11, wherein said normalizing includes upon detecting a MOV instruction in a specific said individually-identifiable code fragment, corresponding to a command to move values to a register, and wherein said MOV instruction is listed in said specific individually-identifiable code fragment before a CALL instruction, normalizing said MOV instruction to a PUSH instruction in said target genes.

14. The system of claim 13, wherein said MOV instruction is normalized to said PUSH regardless of whether said MOV instruction and said CALL instruction are consecutive instructions.

15. The system of claim 11, wherein said normalizing includes upon detecting a SUB instruction, corresponding to a command for a subtraction operation to be performed, normalizing said SUB instruction to an ADD instruction, corresponding to a command for an addition operation to be performed, in said target genes.

16. The system of claim 11, wherein said computer-readable code further includes:
   (vi) program code for determining an accurate designation of said target binary file based on said target genes.

17. The system of claim 16, wherein said determining includes determining said target binary file is malicious based on shared genes in said target genes and said code genome database only found in malicious files.

18. The system of claim 16, wherein said determining includes determining said target binary file is benign based on shared genes in said target genes and said code genome database only found in trusted files.

19. The system of claim 16, wherein said determining includes determining said target binary file is associated with at least one malware file family based on families of files that said target binary file shares shared genes with.

20. A non-transitory computer-readable storage medium, having computer-readable code embodied on the non-transitory computer-readable storage medium, for genetic malware analysis and classification using code reuse patterns, the computer-readable code comprising:
   (a) program code for, upon receiving a target binary file, disassembling said target binary file into assembly code;
   (b) program code for extracting individually-identifiable code fragments from said assembly code;
   (c) program code for normalizing said individually-identifiable code fragments into target genes, wherein said normalizing:
      (i) groups certain instructions in a given said individually-identifiable code fragment that produce identical instruction outputs either individually or in conjunction with at least one other instruction in said given individually-identifiable code fragment; and
      (ii) groups certain said individually-identifiable code fragments into a unique target gene, of said target genes, that forms at most exclusively only one function code for performing a command instruction;
   (d) program code for collating said target genes into a code genome database; and
   (e) program code for detecting all files and/or code families in said code genome database containing said target genes from said target binary file, wherein said detecting includes prioritizing that false-positive matches between said files and/or said code families of said target binary file and said target genes are not detected, wherein said false-positive matches are exemplified as genericized matches among said target genes which are not related to a shared origin source code.

21. The non-transitory computer-readable storage medium of claim 20, wherein said normalizing includes upon detecting a NOP instruction, corresponding to a command for no operation to be performed, removing said NOP instruction from said target genes.

22. The non-transitory computer-readable storage medium of claim 20, wherein said normalizing includes upon detecting a MOV instruction in a specific said individually-identifiable code fragment, corresponding to a command to move values to a register, and wherein said MOV instruction is listed in said specific individually-identifiable code fragment before a CALL instruction, normalizing said MOV instruction to a PUSH instruction in said target genes.

23. The non-transitory computer-readable storage medium of claim 22, wherein said MOV instruction is normalized to said PUSH regardless of whether said MOV instruction and said CALL instruction are consecutive instructions.

24. The non-transitory computer-readable storage medium of claim 20, wherein said normalizing includes upon detecting a SUB instruction, corresponding to a command for a subtraction operation to be performed, normalizing said SUB instruction to an ADD instruction, corresponding to a command for an addition operation to be performed, in said target genes.

25. The non-transitory computer-readable storage medium of claim 20, the computer-readable code further comprising:
   (f) program code for determining an accurate designation of said target binary file based on said target genes.

26. The non-transitory computer-readable storage medium of claim 25, wherein said determining includes determining said target binary file is malicious based on shared genes in said target genes and said code genome database only found in malicious files.

27. The non-transitory computer-readable storage medium of claim 25, wherein said determining includes determining said target binary file is benign based on shared genes in said target genes and said code genome database only found in trusted files.

28. The non-transitory computer-readable storage medium of claim 25, wherein said determining includes determining said target binary file is associated with at least one malware file family based on families of files that said target binary file shares shared genes with.

* * * * *